(12) United States Patent
Park et al.

(10) Patent No.: US 10,885,614 B2
(45) Date of Patent: Jan. 5, 2021

(54) ELECTRONIC DEVICE PERFORMING IMAGE CONVERSION, AND METHOD THEREOF

(71) Applicant: SAMSUNG ELECTRONICS CO., LTD., Suwon-si (KR)

(72) Inventors: Seung-ho Park, Seoul (KR); Seung-hoon Han, Seoul (KR); Ji-won Choi, Suwon-si (KR); Ho-cheon Wey, Seongnam-si (KR); Young-su Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/751,340

(22) PCT Filed: Aug. 8, 2016

(86) PCT No.: PCT/KR2016/008683
§ 371 (c)(1),
(2) Date: Feb. 8, 2018

(87) PCT Pub. No.: WO2017/030311
PCT Pub. Date: Feb. 23, 2017

(65) Prior Publication Data
US 2018/0232867 A1     Aug. 16, 2018

Related U.S. Application Data

(60) Provisional application No. 62/207,119, filed on Aug. 19, 2015.

(51) Int. Cl.
*G06T 5/00* (2006.01)
*G06T 7/40* (2017.01)
(Continued)

(52) U.S. Cl.
CPC .............. *G06T 5/009* (2013.01); *G06T 5/002* (2013.01); *G06T 5/008* (2013.01); *G06T 5/50* (2013.01);
(Continued)

(58) Field of Classification Search
CPC . G06T 2207/20208; G06T 5/00; G06T 5/002; G06T 5/009; G06T 7/40; H04N 5/235
See application file for complete search history.

(56) References Cited

U.S. PATENT DOCUMENTS 7,023,580 B2    4/2006   Zhang et al.
8,593,480 B1   11/2013   Ballestad et al.
(Continued)

FOREIGN PATENT DOCUMENTS

JP    2012-238328   12/2012
KR   10-2005-0068327   7/2005
(Continued)

OTHER PUBLICATIONS

Korean Office Action dated Oct. 1, 2018 in corresponding Korea Patent Application No. 10-2017-7036336.
(Continued)

*Primary Examiner* — Sing-Wai Wu
(74) *Attorney, Agent, or Firm* — Staas & Halsey LLP

(57) ABSTRACT

An electronic device and an image conversion method of the electronic device, the electronic device comprising: a receiving unit for receiving a first image from a source device; a decoding unit for decoding brightness information of the first image; a converting unit for converting a dynamic range of the first image on the basis of the decoded brightness information, using a mapping function; and a display unit for displaying a second image having the converted dynamic range on a display, wherein the mapping function is a curve function including a plurality of points determined on the
(Continued)

basis of the first image, a characteristic of a change in brightness of a display of the source device, and a characteristic of brightness of a scene of the first image. The present disclosure may generate, for example, a high dynamic range (HDR) image, which is improved from a standard dynamic range (SDR) image.

15 Claims, 18 Drawing Sheets

(51) Int. Cl.
*H04N 5/235* (2006.01)
*G06T 5/50* (2006.01)

(52) U.S. Cl.
CPC ......... *H04N 5/235* (2013.01); *G06T 2200/21* (2013.01); *G06T 2207/10024* (2013.01); *G06T 2207/20208* (2013.01)

(56) References Cited

U.S. PATENT DOCUMENTS

| | | | | |
|---|---|---|---|---|
| 8,743,291 | B2* | 6/2014 | Li | G06T 5/009 345/603 |
| 9,087,382 | B2 | 7/2015 | Zhai et al. | |
| 9,224,363 | B2 | 12/2015 | Ballestad et al. | |
| 2006/0104533 | A1* | 5/2006 | Daly | G06T 5/009 382/254 |
| 2006/0188153 | A1* | 8/2006 | Kempf | H04N 9/68 382/167 |
| 2009/0310015 | A1 | 12/2009 | El-Mahdy et al. | |
| 2012/0201456 | A1 | 8/2012 | El-Mahdy et al. | |
| 2013/0114000 | A1* | 5/2013 | Atkins | H04N 5/20 348/708 |
| 2013/0170540 | A1* | 7/2013 | Damkat | G09G 3/3426 375/240.01 |
| 2014/0225941 | A1 | 8/2014 | Van der Vleuten et al. | |
| 2014/0232614 | A1* | 8/2014 | Kunkel | H04N 9/67 345/1.1 |
| 2015/0042890 | A1* | 2/2015 | Messmer | H04N 5/20 348/725 |
| 2015/0103919 | A1 | 4/2015 | Hattori et al. | |
| 2015/0206295 | A1 | 7/2015 | Shah et al. | |
| 2017/0330312 | A1* | 11/2017 | Nam | G06T 5/009 |
| 2017/0330529 | A1* | 11/2017 | Van Mourik | G11B 27/031 |

FOREIGN PATENT DOCUMENTS

| | | |
|---|---|---|
| KR | 10-2011-0115169 | 10/2011 |
| KR | 10-2012-0107429 | 10/2012 |
| KR | 10-2014-0066771 | 6/2014 |
| KR | 10-1481984 | 1/2015 |
| KR | 10-1490727 | 2/2015 |
| WO | WO 2010/105036 A1 | 9/2010 |
| WO | WO 2013/046096 A1 | 4/2013 |

OTHER PUBLICATIONS

International Search Report dated Nov. 7, 2016, in corresponding International Patent Application No. PCT/KR2016/008683.
Written Opinion of the International Search Authority dated Nov. 7, 2016, in corresponding International Patent Application No. PCT/KR2016/008683.
Hattori et al., "HLS: SEI message for Knee Function Information", Joint Collaborative Team on Video Coding (JCT-VC) of ITU-T SG 16 WP 3 and ISO/IEC JTC 1/SC29/WG 11, Sony Corporation, 16th Meeting: San Jose, US, Jan. 9-17, 2014, pp. 1-21.
"SMPTE Standard Mastering Display Color Volume Metadata Supporting High Luminance and Wide Color Gamut Images" SMPTE ST 2086:2014, The Society of Motion Picture and Television Engineers, Oct. 13, 2014, pp. 1-6.
Korean Office Action dated Apr. 19, 2019 in corresponding Korean Patent Application No. 10-2017-7036336.

* cited by examiner

FIG. 2A
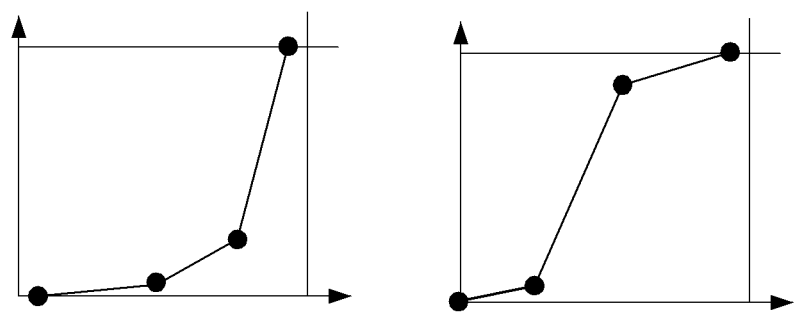
(a)
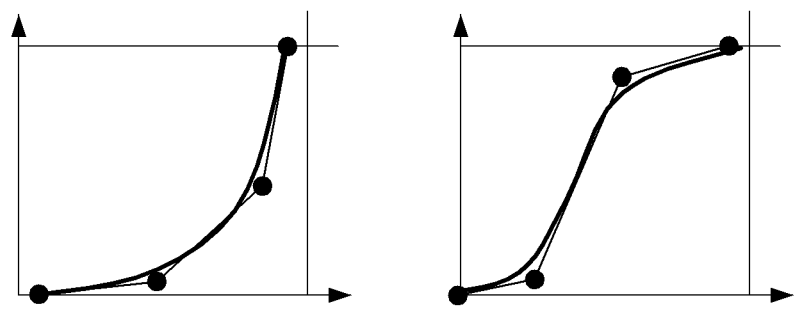
(b)

FIG. 3B
(a) 
(b) 

FIG. 8
(a)
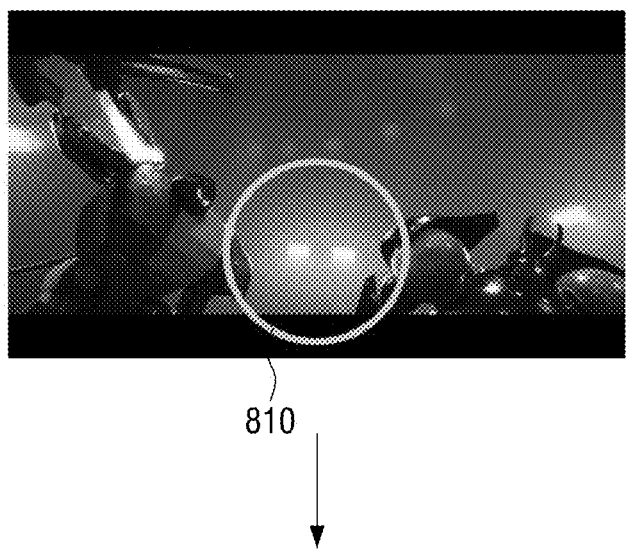
810
(b)
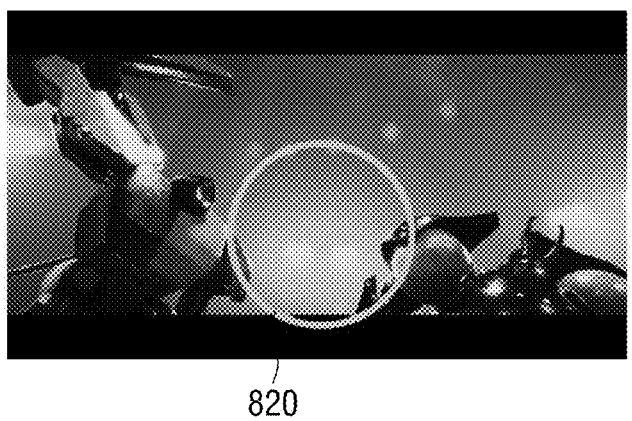
820

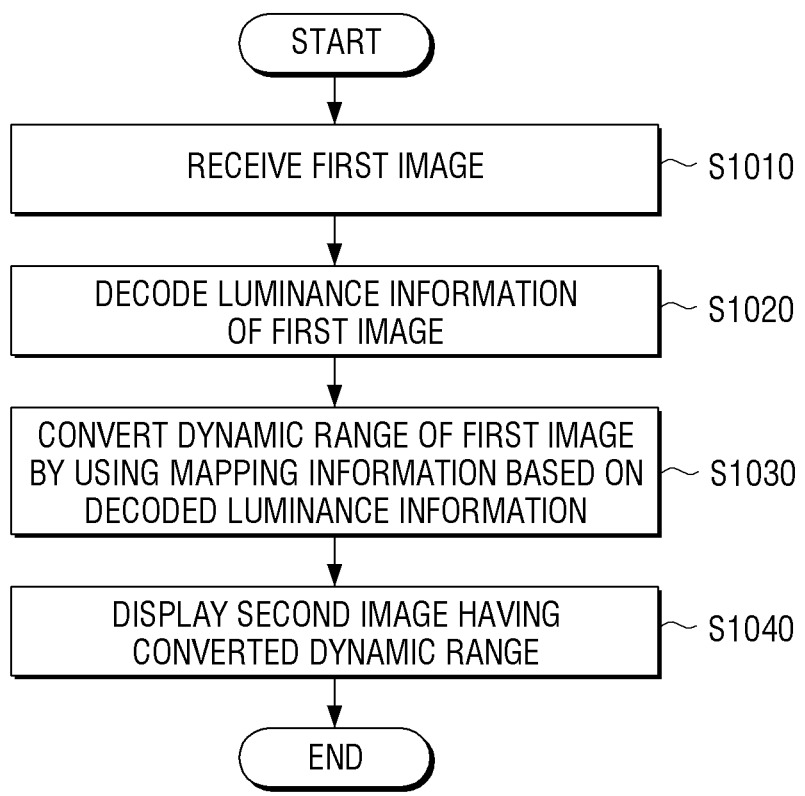

ELECTRONIC DEVICE PERFORMING IMAGE CONVERSION, AND METHOD THEREOF

CROSS-REFERENCE TO RELATED APPLICATION

This application is a U.S. National Stage Application which claims the benefit under 35 U.S.C. § 371 of PCT International Patent Application No. PCT/KR2016/008683, filed Aug. 8, 2016, which claims the priority benefit under 35 U.S.C. § 119 of U.S. Provisional Patent Application No. 62/207,119, filed Aug. 19, 2015, the contents of which are incorporated herein by reference.

TECHNICAL FIELD

Apparatuses and methods consistent with example embodiments relate to an electronic device performing image conversion by using an inverse Tone Mapping (iTM), and a method for image conversion, and more particularly, to an electronic device converting a first image to a second image having a different dynamic range by using a mapping function based on the brightness variation characteristics of a display and the scene brightness characteristics of the first image.

DESCRIPTION OF RELATED ART

The recent increase in the high dynamic range (HDR) contents has led to the development of various techniques to reproduce a low dynamic range (LDR) content and a standard dynamic range (SDR) content on an available HDR display.

When converting the LDR image and the SDR image to a HDR image, inverse Tone Mapping (iTM) is generally used. The iTM inverts the luminance map of the input LDR image and the input SDR image to the HDR luminance by using the iTM function.

In related art, the mapping function used to convert the LDR image and the SDR image to the HDR image is linear. Accordingly, when the dynamic range of the image is converted using the related art mapping function, the converted image has a problem of a hue and saturation change and a color contour due to the step difference. In addition, when the mapping is generated in a curve shape, in related art, there is a problem that the mapping function requires multiple points for forming a curve.

DETAILED DESCRIPTION

Technical Problem

One or more exemplary embodiments provide a method for image conversion using a curve-type mapping function based on the luminance characteristics of the display and the scene luminance characteristics of the input image when the dynamic range of the image is to be converted, and an electronic device.

Solution to Problem

According to an aspect of an example embodiment, there is provided an electronic device, comprising: a receiving unit for receiving a first image from a source device; a decoding unit for decoding luminance information of the first image; a converting unit for converting a dynamic range of the first image on the basis of the decoded luminance information, using a mapping function; and a display unit for displaying a second image having the converted dynamic range on a display. The mapping function may be a curve function including a plurality of points determined on the basis of a characteristic of a change in luminance of a display of the source device, and a characteristic of a change in luminance of a scene of the first image.

The mapping function may be a piecewise linear function including a plurality of points. A smoothing filter may be applied to the piecewise linear function.

The plurality of points may include a shadow point, which is a black level. The shadow point may be converted from a black level of the first image to a black level of the display. A low gradation black of the first image may be maintained according to a ratio of a luminance of the first image to a luminance of the display.

The plurality of points may include a peak point, which is a white level. The peak point may be converted from a white level of the first image to a white level of the display. A maximum luminance of a scene of the first image may be mapped as a maximum luminance of the display.

The plurality of points may include a middle point, which is an intermediate tone level. The middle point may be converted from an intermediate tone level of the first image to an intermediate tone level of the display. An average pixel level may be adjusted based on a characteristic of a change in luminance of a display of the source device, and a characteristic of a change in luminance of a scene of the first image.

In response to a metadata including the plurality of points and parameter generating the mapping function being received from the source device, the electronic device may acquire the plurality of points and the parameter from the metadata and generate a mapping function by adjusting the plurality of acquired points and the acquired parameter/

The converting unit may convert a dynamic range of the first image by applying a gain value obtained from the mapping function to primary colors of red (R), green (G), and blue (B) of the first image in the same manner.

The mapping function is $$\begin{bmatrix} R_{out} \\ G_{out} \\ B_{out} \end{bmatrix} = \left( w \cdot \begin{bmatrix} R_{in} \\ G_{in} \\ B_{in} \end{bmatrix} \right),$$

where w may be $f(Y_{in})/Y_{in}$, which is a gain value obtained from the mapping function, and f(x) is an inverse Tone Mapping function (iTM), and $Y_{in}$ is a luminance value of the first image, and ($R_{in}$, $G_{in}$, $B_{in}$) is RGB coordinates of a white level of a first image, and ($R_{out}$, $G_{out}$, $B_{out}$) are RGB coordinates of a white level of a display on which a converted image is displayed.

A function to preserve hue and saturation of the first image based on the mapping function is $$\begin{bmatrix} R_{out} \\ G_{out} \\ B_{out} \end{bmatrix} = \alpha \cdot \left( w \cdot \begin{bmatrix} R_{in} \\ G_{in} \\ B_{in} \end{bmatrix} \right) + (1-\alpha) \cdot f\left( \begin{bmatrix} R_{in} \\ G_{in} \\ B_{in} \end{bmatrix} \right),$$

where w is $f(Y_{in})/Y_{in}$, which is a gain value obtained from the mapping function, and f(x) is an inverse Tone Mapping (iTM) function, and $Y_{in}$ is a luminance value data of the first image, and α is a constant, and ($R_{in}$, $G_{in}$, $B_{in}$) are RGB coordinates of a white level of a first image, and ($R_{out}$, $G_{out}$, $B_{out}$) are RGB coordinates of a white level of a display on which a converted image is displayed.

According to an aspect of an example embodiment, there is provided an image conversion method, comprising: receiving a first image from a source device; decoding luminance information of the first image; converting a dynamic range of the first image on the basis of the decoded luminance information, using a mapping function; and displaying a second image having the converted dynamic range on a display. The mapping function may be a curve function including a plurality of points determined on the basis of a characteristic of a change in luminance of a display of the source device, and a characteristic of a change in luminance of a scene of the first image.

The mapping function may be a piecewise linear function including a plurality of points. A smoothing filter may be applied to the piecewise linear function.

The plurality of points may include a shadow point, which is a black level. The shadow point may be converted from a black level of the first image to a black level of the display. A low gradation black of the first image may be maintained according to a ratio of a luminance of the first image to a luminance of the display.

The plurality of points may include a peak point, which is a white level. The peak point may be converted from a white level of the first image to a white level of the display. A maximum luminance of a scene of the first image may be mapped as a maximum luminance of the display.

The plurality of points may include a middle point, which is an intermediate tone level. The middle point may be converted from an intermediate tone level of the first image to an intermediate tone level of the display. An average pixel level may be adjusted based on a characteristic of a change in luminance of a display of the source device, and a characteristic of a change in luminance of a scene of the first image.

The image conversion method may further include, in response to a metadata including the plurality of points and parameter generating the mapping function being received from the source device, acquiring the plurality of points and the parameter from the metadata and generate a mapping function by adjusting the plurality of acquired points and the acquired parameter.

The converting may include converting a dynamic range of the first image by applying a gain value obtained from the mapping function to primary colors of red (R), green (G), and blue (B) of the first image in the same manner.

Effect of the Invention

As described above, according to the example embodiments of the present disclosure, the step difference, saturation change and color contour which may occur when the first image is converted to the second image having a different dynamic range by using a mapping function may be removed, thereby providing an electronic device providing an image having an improved dynamic range and a method for image conversion.

BRIEF DESCRIPTION OF DRAWINGS

FIG. 2A is a block diagram illustrating a mapping function, according to an example embodiment;
FIGS. 3B and 3C are images illustrating an image conversion using a mapping function, according to an example embodiment;
FIG. 8 are images illustrating a hue and saturation preservation using a mapping function, according to an example embodiment;
FIG. 10 is a sequence diagram illustrating a method for image conversion, according to an example embodiment.

PREFERRED EMBODIMENTS FOR CARRYING OUT THE INVENTION

Figure 1:
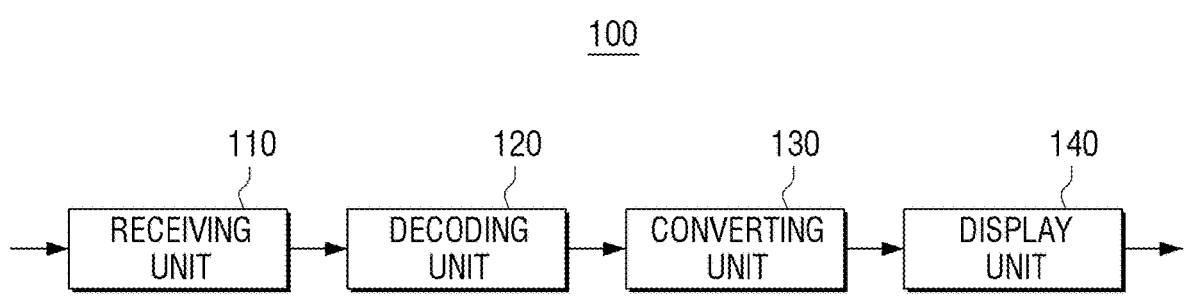
FIG. 1 is a block diagram illustrating a configuration of an electronic device, according to an example embodiment.

Hereinafter, the terms used in exemplary embodiments will be briefly explained, and exemplary embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be realized as at least one processor except for 'modules' or 'units' that should be realized in a specific hardware.

The term "mapping function" as used herein may include the "inverse Tone Mapping function" which converts a dynamic range of an image by using the "inverse Tone Mapping".

The above and other aspects of the present disclosure will become more apparent by describing in detail exemplary embodiments thereof with reference to the accompanying drawings. However, exemplary embodiments may be realized in a variety of different configurations, and not limited to descriptions provided herein. Further, those that are irrelevant with the description are omitted so as to describe exemplary embodiments more clearly, and similar drawing reference numerals are used for the similar elements throughout the description.

FIG. 1 is a block diagram illustrating a configuration of an electronic device, according to an example embodiment.

With reference to FIG. 1, the electronic device 100 includes a receiving unit 110, a decoding unit 120, a converting unit 130, and a display 140.

The electronic device 100 may receive the low dynamic range (LDR) image and the standard dynamic range (SDR) image from an external device, which is a source device, and display a desired dynamic image.

For example, the electronic device 10 may be a display device which is capable of displaying the HDR image. For example, the electronic device 100 may be an apparatus which displays a peak brightness, such as an HDR LCD TV, LED TV, and the like. The electronic device 100 is not limited to the above-described examples, and may be various display devices, such as a smartphone, a tablet, a laptop, a PC monitor, a CRT display, a LCD TV, an OLED TV, and the like.

For example, the source device may be a display device which is capable of displaying the SDR image. The source device may be a contents provider, such as a broadcasting station, or an image processing apparatus (for example, Blue-Ray™, network streaming device, and the like) which is coupled to the electronic device 100. In addition, the source device may be a notebook PC, a tablet, a smartphone, and the like.

According to an example embodiment, the components of the electronic device 100 and the method for image conversion may be applied to the source device, or may be applied to the target device which displays the final converted HDR image.

The receiving unit 110 may receive an encoded first image (for example, encoded image data) having a first dynamic range from the source device. The encoded first image data may be a data relating to a first image having a luminance in a first dynamic range.

For example, the receiving unit 100 may receive an image processing signal of a SDR image from the source device via a wireless or wired network communication. The receiving unit 110 may receive, from the source device, mapping function information which is capable of converting a first image to a second image having a second dynamic range. For example, the mapping function information may be a plurality of points and parameters and the like, capable of generating a mapping function. The receiving unit 110 may receive a plurality of points and parameters from the source device as metadata. The plurality of points may be determined based on the scene luminance of the first image and the luminance variation characteristics of the display of the source device.

In response to the receiving unit 110 receiving mapping function information as metadata from the source device, the electronic device 100 may acquire a plurality of points and parameters, and the like from the metadata and provide them to the decoding unit 120, and may adjust the plurality of acquired points and parameters and the like, generate a suitable mapping function for the user, and supply the generated mapping function to the converting unit 130.

The decoding unit 120 may decode luminance information of the encoded first image. The decoding unit 120 may decode a first image having a luminance in the first dynamic range. The decoding unit 120 may provide the decoded first image to the converting unit 130.

The display 140 may display, on the display, a second image having a second dynamic range converted in the converting unit 130. For example, the display 140 may include a display for HDR images.

The converting unit 130 may convert a dynamic range of a first image to a second image having a desired dynamic range based on the luminance information of the first image decoded in the decoding unit 120 using the mapping function.

The mapping function used in the converting unit 130 may be a mapping function generated in the source device, a mapping function stored at the time of manufacturing of the electronic device, or may be a mapping function generated by the electronic device 100 based on the mapping function information provided from the source device.

The converting unit 130 may convert a dynamic range of the first image to a second image having a desired dynamic range based on the luminance variation characteristics of the display of the source device. The luminance variation characteristics of the display of the source device will be described later with reference to FIG. 6A.

The converting unit 130 may convert a dynamic range of the first image based on the characteristics of the scene luminance of the first image.

In addition, according to an example embodiment, the converting unit 130 may remove the noise (step difference) of the image due to the inverse Tone Mapping (iTM) by applying a smoothing filter to the mapping function, and increase the dynamic range of the converted image.

In addition, the converting unit 130 may perform a dynamic range conversion to maintain the hue and saturation of the first image by applying the saturation compensation to the mapping function.

According to an example embodiment, the luminance information of the first image may be a code value which is generated by normalizing the luminance value of the first image from 0 to 1.

The mapping function according to an example embodiment may be a piece-wise linear function having a code value of the first image as an input value. In this regard, the code value may be a plurality of points which are determined based on the luminance information of the first image.

The plurality of points may be a shadow point constituting a black level of a first image and the converted second image, a middle point consisting an intermediate-tone level (gray) of the first image and the converted second image, and a peak point constituting a white level of the first image and the second image. The plurality of points according to an example embodiment will be described in detail below with reference to FIGS. 2A, 2B, 3A, 3B, 3C, 4A, 4B, 5A and 5B.

In addition, the mapping function may be a mapping function which uses the inverse Tone Mapping.

Accordingly, the x-axis value of the mapping function graph may be a code value which is generated by normalizing the luminance value of the first image from 0 to 1. In addition, the y-axis value of the mapping function graph may be a display luminance (nit or $cd/m^2$) of the electronic apparatus 100 according to the code value of the first image.

According to an example embodiment, a mapping function and a method for image conversion using the mapping function will be described below with reference to FIGS. 2A, 2B, 3A, 3B, 3C, 4A, 4B, 5A, 5B, 6A, 6B, 7, 8, 9A, 9B, 10 and 11.

FIG. 2A is a graph briefly illustrating a mapping function, according to an example embodiment.

In general, the inverse Tone Mapping (iTM) is used to display the SDR image on the display for HDR images. When an image is converted using the iTM, the noise may occur from the iTM quantization.

According to an example embodiment, to expand the dynamic range of the first image and convert it to the second image, the electronic device 100 may use the curve-type mapping function using the iTM. In addition, the electronic device 100 may apply a smoothing filter to the mapping function and remove the step difference (for example, noise, color contour, and the like) that occurs during the image conversion.

The graph (a) at the upper end of FIG. 2A illustrates a related art mapping function. In general, in response to the low dynamic range (LDR) image and the standard dynamic range (SDR) image are converted to the high dynamic range (HDR) image and displayed, the related-art mapping function is rectilinear. In addition, when the related-art mapping function is to be generated as a curve-type function, a number of x-axis points (luminance values of the input image) are required.

Accordingly, when the image is converted using the related-art mapping function, there is a problem that the converted image has a step difference and a color contour.

The graph (b) at the bottom end of FIG. 2A illustrates a mapping function according to an example embodiment. According to an example embodiment, the mapping function is a piece-wise linear function including N-number of points. Accordingly, the mapping function according to an example embodiment may generate all types of curve-type graphs. In addition, it is possible to remove the step difference occurring at the N-number of points generating the mapping function by applying the smoothing filter to the curve-type mapping function.

Figure 2B:
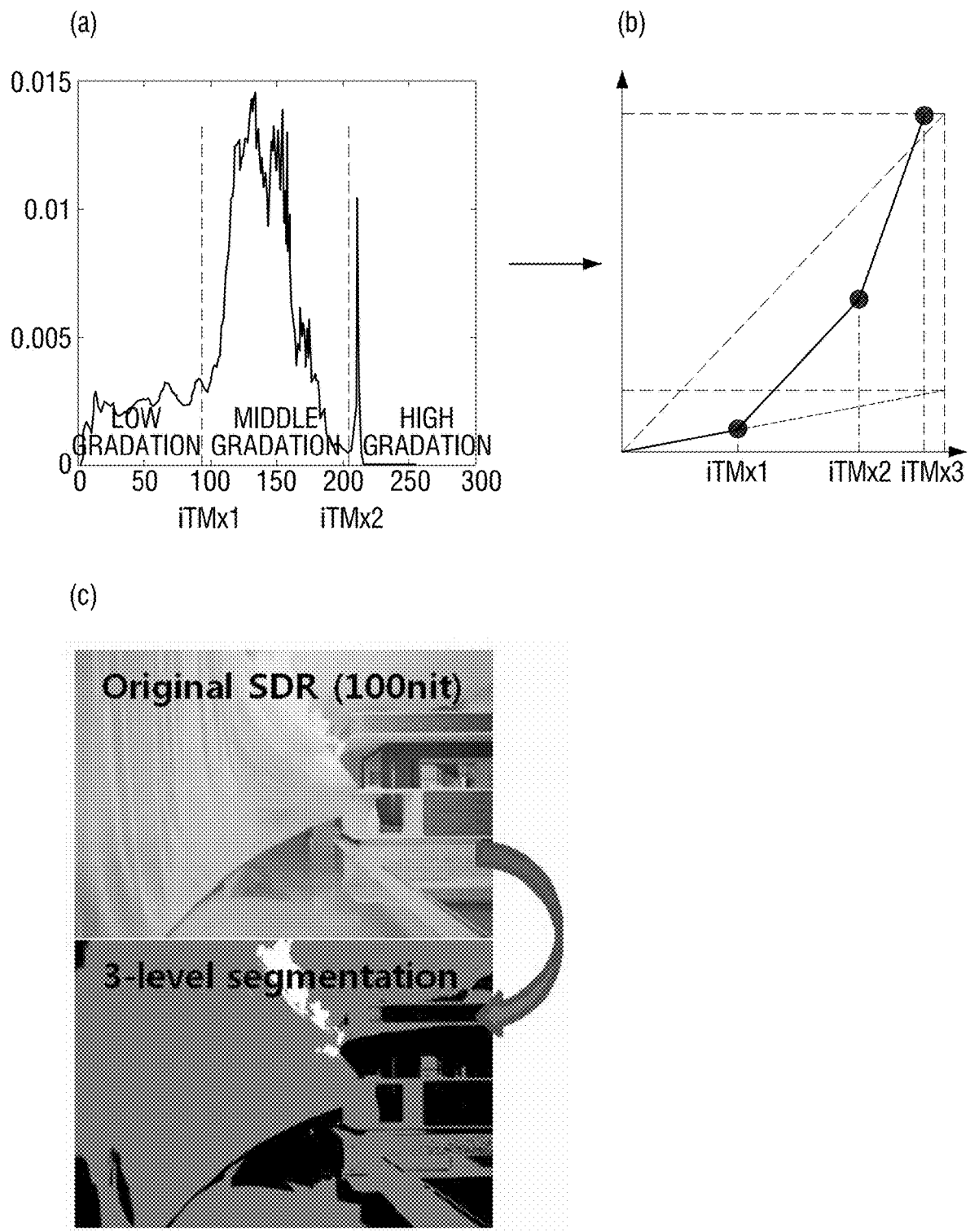
FIG. 2B is a diagram illustrating a three-level segmentation, according to an example embodiment.

FIG. 2B is a diagram illustrating a 3-level segmentation of a mapping function, according to an example embodiment.

According to an example embodiment, the first image may be divided into areas of three levels. For example, the three levels may be divided into a low gradation, which is a black level of the first image, a middle gradation, which is a gray level of the first image, and a high gradation, which is a white level of the first image.

The first graph (a) of FIG. 2B is a histogram illustrating selecting a break point which is capable of generating a mapping function in the source device and the electronic device 100, according to an example embodiment.

The mapping function according to an example embodiment may have break points that divide a boundary of 3-level segmentation (low gradation, middle gradation and high gradation) of the first image as a plurality of points.

According to an example embodiment, the break points may be a shadow point which is a threshold value of a black level of a pixel included in an image, a middle point which is a threshold value of an intermediate tone level of the pixel, and a peak point which is a threshold value of a white level of the pixel.

For example, the source device may divide the standard dynamic range (SDR) image into 3 level class using the Otsu algorithm. In this regard, the source device may classify the classes in which the pixel luminance of the SDR images are relatively similar to each other into pixel luminance classes (low gradation, middle gradation and high gradation) included in the SDR image. The valley point of the pixel luminance values of three classes may be a threshold value of each class.

According to an example embodiment, a threshold value of the valley point may be identified by maximizing the within-class variance. In addition, the between-class variance may be identified by multiplying threshold value selection points of the low gradation, the middle gradation and the high gradation by different values.

For example, the valley point included in the threshold value of the low gradation may be a shadow point, and the valley point included in the threshold value of the middle gradation. In addition, the valley point included in the threshold value of the high gradation may be a peak point. In this regard, the between-class variance may be maximized by multiplying 1 at the shadow point (iTM×1), multiplying 2 at the middle point by 2 (iTM×2), and multiplying 3 at the peak point (iTM×3).

The second graph (b) of FIG. 2B illustrates generating an iTM curve graph in the source device and the electronic device (100) by the curve parameter (iTM×1, iTM×2 and iTM×3) of the inverse Tone Mapping (iTM) derived by the Otsu algorithm.

For example, the iTM×1, which is the low gradation curve parameter, may be a shadow point of the iTM curve graph, and the iTM×2, which is the low gradation curve parameter, may be a middle point of the iTM curve graph. In addition, the iTM×3, which is the high gradation curve parameter, may be a peak point of the iTM curve graph. In addition, the three curve parameters, iTM×1, iTM×2 and iTM×3, may be a plurality of points included in the horizontal axis of the mapping function, which may generate a piecewise linear function.

The third diagram (c) of FIG. 2B illustrates an image in which an iTM curve parameter is obtained by performing 3 level segmentation with respect to the SDR image of the 100 nit brightness received from the source device. The original SDR image has 3 level segmentation of black color, gray color and white color, which are three classes of which the luminance is relatively similar to one another by the Otsu Algorithm. Accordingly, according to an example embodiment, the electronic device 100 may easily detect a highlight from a high gradation (white level) of the first image based on the 3 level segmentation of the first image classified using the Otsu algorithm.

According to the above-described example embodiment, the source device may generate a mapping function by using information relating to a break point (a plurality of points) selected using the Otsu algorithm. The break point (a plurality of points) information which generates a mapping function, the iTM curve parameter information, the parameter information of the smoothing filter, and the like may be mapping function information. The source device may supply the generated mapping function information to the electronic device 100.

In addition, the source device may generate the mapping function information as metadata. The source device may supply the generated metadata to the electronic device 100 as the mapping function information.

When the metadata is supplied from the source device, the electronic device 100 may acquire information relating to a break point and parameter from the supplied metadata. In this regard, the electronic device 100 may generate a suitable mapping function for the user by adjusting the break point and parameter acquired from the metadata, by recovering the mapping function generated at the source device or by using the mapping function built in at the time of the manufacturing of the electronic device 100. Accordingly, the electronic device 100 may convert a first image received from the source device to a second image having a suitable dynamic range for the electronic device 100 by using the generated mapping function.

Figure 3A:
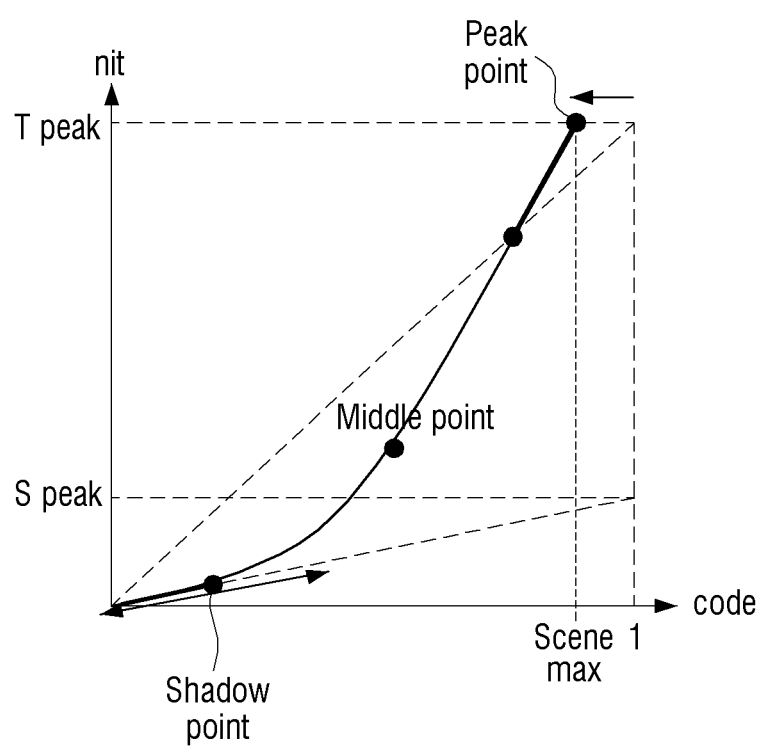
FIG. 3A is a graph illustrating a specified mapping function, according to an example embodiment.

FIG. 3A is a graph illustrating a specified mapping function, according to an example embodiment.

Referring to FIG. 3A, according to an example embodiment, the mapping function is a curve-type function, which is a piecewise linear function including a plurality of points identified based on the luminance characteristics of a scene of the first image and the luminance variation characteristics of the source device (for example, a display for SDR images).

For example, the plurality of points may include a shadow point which is a black level, a middle point which is an intermediate tone level, and a peak point which is a white level, as illustrate above with reference to FIGS. 2A and 2B.

For example, on the shadow point, it may be converted from the black level of the SDR image to the black level of the electronic device 100 (for example, a display for HDR images). In this regard, according to a ratio between the luminance of the SDR image (for example, a display for SDR images) and the luminance of a display for HDR images, the electronic device 100 may maintain the low gradation black at the black level of the electronic device (100) (for example, a display for HDR images).

For example, in the low gradation black interval from among the 3 level segmentation derived in FIG. 2A, the electronic device 100 (for example, a display for HDR images) may be controlled to maintain the brightness of the first image in the source device (for example, a display for SDR images).

For example, in response to an inclination (d) of the origin (0,0) of the graph to the code value input from the shadow point is 0.1 or less (d=nit/code value, the luminance of the display for HDR images/code value), the electronic device 100 may identify the section in which the inclination is 0.1 or less as a low gradation black maintenance section. However, the low gradation black maintenance section according to the inclination value (for example, d=0.1) described above is merely an example, but is not limited thereto and may be variously modified.

The peak point may be converted from the white level of the first image to the white level of the electronic device 100 (for example, a display for HDR images). The peak point may be a value which is generated by mapping the maximum luminance of the scene of the first image to the maximum luminance of the electronic device 100.

For example, in general the pixel luminance of the SDR image may be between 0 to 200 nit. In response to the SDR image being converted to the HDR image using the inverse Tone Mapping (iTM), the pixel luminance of 0 to 200 nit of the SDR image may be converted to a code value which is normalized to 0 to 1 (p–200 nit/200 nit).

According to an example embodiment, the maximum pixel luminance of the SDR image may have different values according to a scene mode, such as sunset, sunrise, and the like. For example, in response to the SDR image being an image of sunset, the maximum pixel luminance of the SDR image may be 140 nit, which is less than the maximum pixel luminance of a general image, 200 nit.

In this regard, the maximum pixel luminance (Scene Max) of the SDR image of a sunset scene may be 0.7 (140 nit/200 nit), which is the maximum value of the values generated by normalizing 0-140 nit. Accordingly, the electronic device 100 may have a maximum luminance at the maximum scene brightness (Scene max) (code value=0.7) of the SDR image.

That is, the electronic device 100 may maintain the luminance at the source device (for example, a display for SDR images) on the shadow point, and increase the whole luminance of the SDR image by mapping the scene maximum luminance pixel value of the SDR image to the peak luminance of the electronic device 100 (for example, a display for HDR images) on the peak point. Accordingly, in the converted HDR image, the electronic device 100 may maintain the dynamic range of the black level of the SDR image and expand the dynamic range of the white level of the SDR image. Accordingly, as the maximum luminance of the electronic device 100 (for example, a display for HDR images) is changed according to the scene maximum luminance of the SDR image, the electronic device 100 may acquire a HDR image having a dynamic range of a more expanded area suitable for the scene of the SDR image.

Figure 3C:
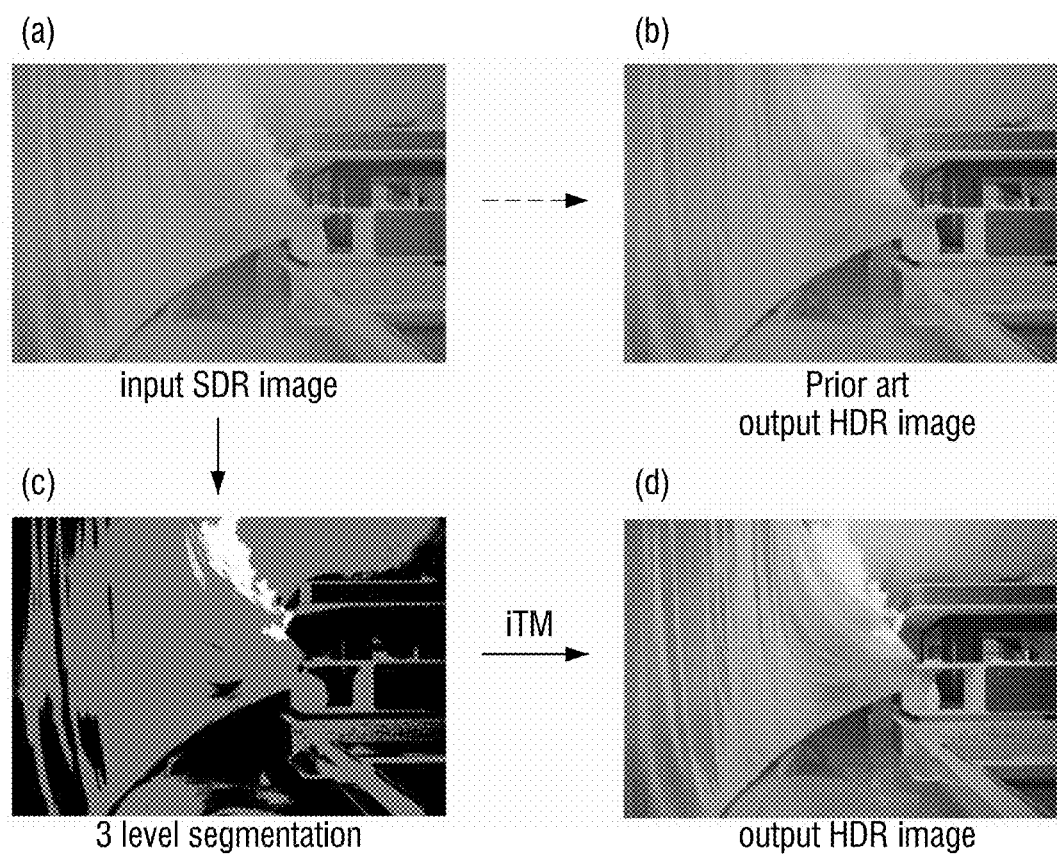

FIGS. 3B and 3C are images illustrating an image conversion using a mapping function, according to an example embodiment.

FIG. 3B illustrates an image to which the feature described above is applied. Referring to FIG. 3B, the image (a) at the upper end is a HDR image generated by applying the related-art inverse Tone Mapping (iTM) to the SDR image. The image (b) at the lower end of FIG. 3B is a HDR image generated by applying the mapping function using the iTM according to an example embodiment to the SDR image.

TABLE 1

Maintain the low gradation black and increase the maximum luminance pixel value of the image

| Scene | Comparison Item | SDR input | After iTM processing | Variation(Δ) |
|---|---|---|---|---|
| Sunset Horse | Average luminance (APL) | 44 | 41 | −3 |
| | Maximum pixel value | 232 | 255 | 20 |
| | Whole luminance (Nit) | 455 | 555 | +100 nit |

Table 1 illustrates, when a mapping function of the present disclosure is applied to the SDR image in the sunset horse scene of FIG. 3B, a luminance variation of the converted HDR image (figure (b) of FIG. 3B), according to an example embodiment.

For example, in response to a scene of the SDR image being a sunset, the average pixel level of the SDR image may be reduced by 3 from 44 to 41 after the inverse Tone Mapping (iTM) processing. The maximum luminance pixel value of the SDR image may be increased by 20 pixels from 232 to 255 after the iTM processing. In addition, the overall luminance of the SDR image is increased from 455 nits to 555 nits after iTM processing, resulting in an increase in brightness of 100 nits. In other words, in the SDR image of the sunset scene, the shadow point (black level) maintains the black level of the SDR image and the peak point (white level, highlight) maps the maximum luminance of the SDR image to the electronic device 100, Thus, the average pixel luminance (APL) is decreased but the overall luminance (nit) is increased.

Accordingly, according to an example embodiment, the HDR image (b) at the bottom end of FIG. 3B may have a dynamic range which is more expanded in the peak level compared with the HDR image (a) to which the related-art iTM is applied.

The middle point may be converted from the gray level, which is the intermediate tone level of the SDR image, to the intermediate tone level of the electronic device 100 (for example, the display for the converted HDR image). The detailed description of the middle point will be described later with reference to FIGS. 5A, 5B, 6A, 6B and 7.

FIG. 3C illustrate that an SDR image is converted to an HDR image using a mapping function described in FIGS. 2B and 3B.

Referring to FIG. 3C, the source device (for example, a display device for SDR images) may divide the SDR image (figure (a)) into sections of low gradation (black color), middle gradation (gray color), and a high gradation (white color) of 3 level segmentation by using the Otsu algorithm described above with reference to FIG. 2B. In addition, the source device may select a shadow point, a middle point and a peak point, which are the iTM curve parameters corresponding to each section of the 3 level segmentation. When the iTM curve parameters are provided as metadata from the source device, the electronic device 100 may recover the mapping function, acquire the iTM curve parameters and a plurality of points from the metadata, and generate a suitable mapping function for the user.

According to an example embodiment, the electronic device 100 may maintain the luminance of the low gradation (black) section from among the luminance of the display of the electronic device 100 at the brightness of the SDR image, and may change the luminance of the high gradation (white) section to the scene maximum luminance of the SDR image. Accordingly, the electronic device 100 may acquire, from the SDR image (figure (a)), the HDR image (figure (d)) having a dynamic range of which the luminance area of the high gradation is more expanded compared with the related-art HDR image (figure (b)) by using the mapping function.

Figure 4A:
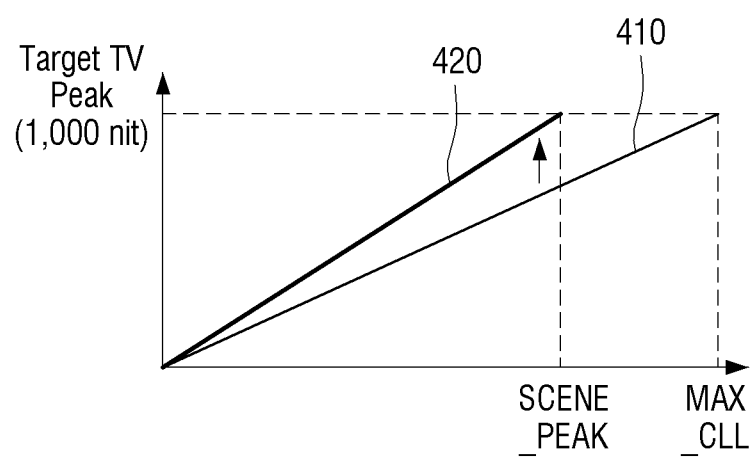
FIG. 4A is a graph illustrating a peak point of a mapping function, according to an example embodiment.

FIG. 4A is a graph illustrating a peak point of a mapping function, according to an example embodiment.

Referring to FIG. 4A, in related art, a mapping function in which the maximum black point luminance of the first image is mapped as a peak point of a display for HDR images (target TV) is used, 410. However, according to an example embodiment, the scene maximum luminance of the first image may be mapped as a peak point for the maximum luminance of the display for HDR images, 420. As described in Table 1, when the SDR image is converted to the HDR image using the mapping function according to an example embodiment, the average pixel luminance of the converted HDR image is reduced, but the pixel value having the maximum luminance and the overall luminance of the image are increased. Accordingly, the electronic device 100 may acquire an HDR image having a wider dynamic range in the black level of the SDR image.

Figure 4B:
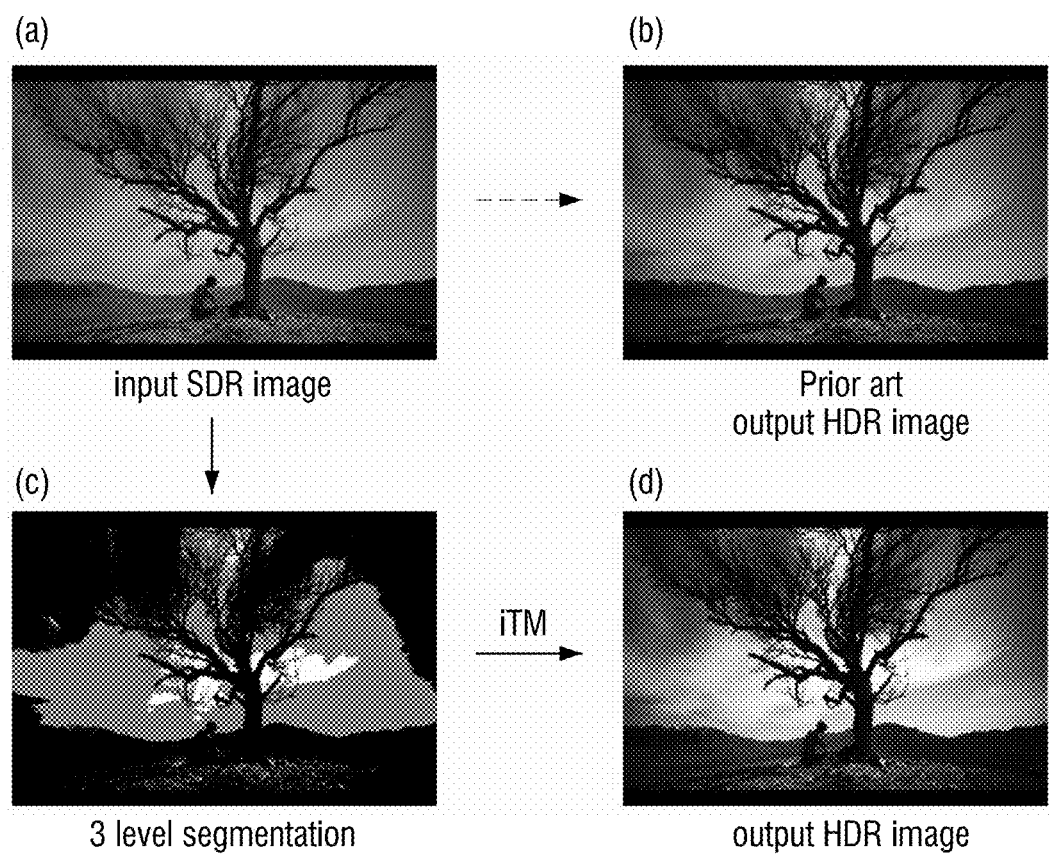
FIG. 4B are images illustrating an image conversion at a peak point and a shadow point using a mapping function, according to an example embodiment.

FIG. 4B are images illustrating an image conversion on the peak point and shadow point using the mapping function, according to an example embodiment.

Referring to FIG. 4B, the input SDR image (figure (a)) may be divided (figure (b)) into a low gradation (black color), a middle gradation (gray color), and a high gradation (white color), based on the 3 level segmentation of the present disclosure. In this regard, as described with reference to FIG. 4B, the maximum luminance of the high gradation (white color) of the SDR image may be mapped to the maximum luminance of the electronic device 100 (for example, a display for HDR images) by using the inverse Tone Mapping (iTM) (figure (d)). Accordingly, the electronic device 100 may convert the SDR image (figure (a)) to the HDR image having a more expanded dynamic range compared with the HDR image (figure (b)) using the related-art iTM.

Figure 5A:
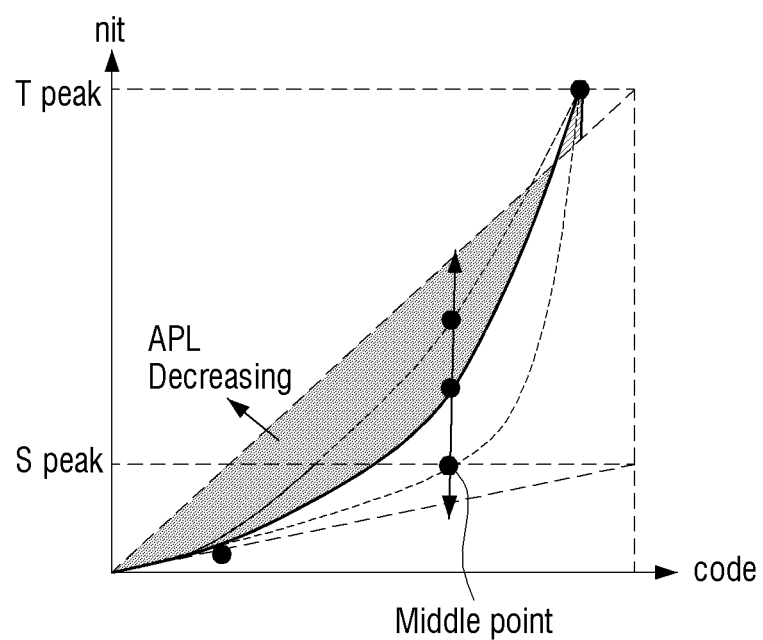
FIG. 5A is a graph illustrating a middle point of a mapping function, according to an example embodiment.

FIG. 5A is a graph illustrating a middle point of a mapping function, according to an example embodiment.

The middle point may be converted from a gray level, which is the intermediate tone level of the first image, to an intermediate tone level of the electronic device 100 (for example, a display for HDR images).

Referring to FIG. 5A, the middle point may be adjusted according to the average pixel level of the first image (for example, a SDR image) based on the luminance variation characteristics of the source device (for example, a display for SDR images).

For example, the average pixel level (APL) of the SDR image may be reduced according to the luminance variation characteristics of the panel of the display for SDR images. When the luminance of the display panel for SDRM images becomes dark, the APL of the SDR image is reduced. In this regard, the peak luminance of the SDR image may be increased using the power remaining in the darkened portion of the display panel.

In another example, the middle point may be adjusted by reducing the average pixel level of the SDR image based on the scene luminance characteristics of the SDR image described above with reference to FIGS. 3A, 3B, 3C, 4A and 4B.

Accordingly, on the middle point, the luminance of the middle gradation of the HDR image may be changed according to the reduction in APL of the SDR image.

Figure 5B:
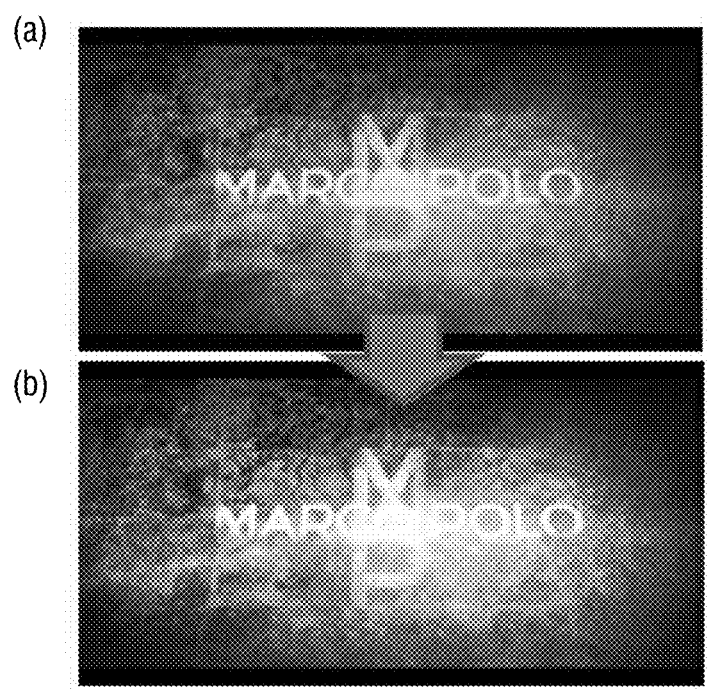
FIG. 5B are images illustrating an image conversion using a mapping function, according to an example embodiment.

FIG. 5B are images illustrating an image conversion using a mapping function at a middle point, according to an example embodiment.

The image (figure (a)) at the upper end of FIG. 5B is an image generated by converting the SDR image to the HDR image by using the related-art inverse Tone Mapping (iTM). The image (figure (a)) at the bottom end of FIG. 5B is an image generated by converting the SDR image to the HDR image by using the mapping function according to an example embodiment.

Table 2 illustrates a luminance variation in the HDR image (figure (b)) of FIG. 5B, according to an example embodiment.

TABLE 2

Middle gradation luminance adjustment

| Scene | Comparison Item | SDR input | After iTM processing | Variation($\Delta$) |
|---|---|---|---|---|
| Marco | Average pixel luminance (APL) | 106 | 95 | −11 |
|  | Maximum pixel value | 255 | 255 | 0 |
|  | Overall luminance (Nit) | 527 | 630 | +103 nit |

Referring to Table 2, the peak luminance of the HDR image may be increased by reducing the average pixel level of the SDR image according to the luminance characteristics of the source device (for example, a display for SDR images) in the middle gradation section. The detailed description thereof will be described later with reference to FIGS. 6A and 6B.

Accordingly, the HDR image (figure (b)) according to an example embodiment may have a wider dynamic range than the related-art HDR image (figure (a)) according to the luminance characteristics variation of the display for SDR images and the scene luminance characteristics of the SDR image.

Figure 6A:
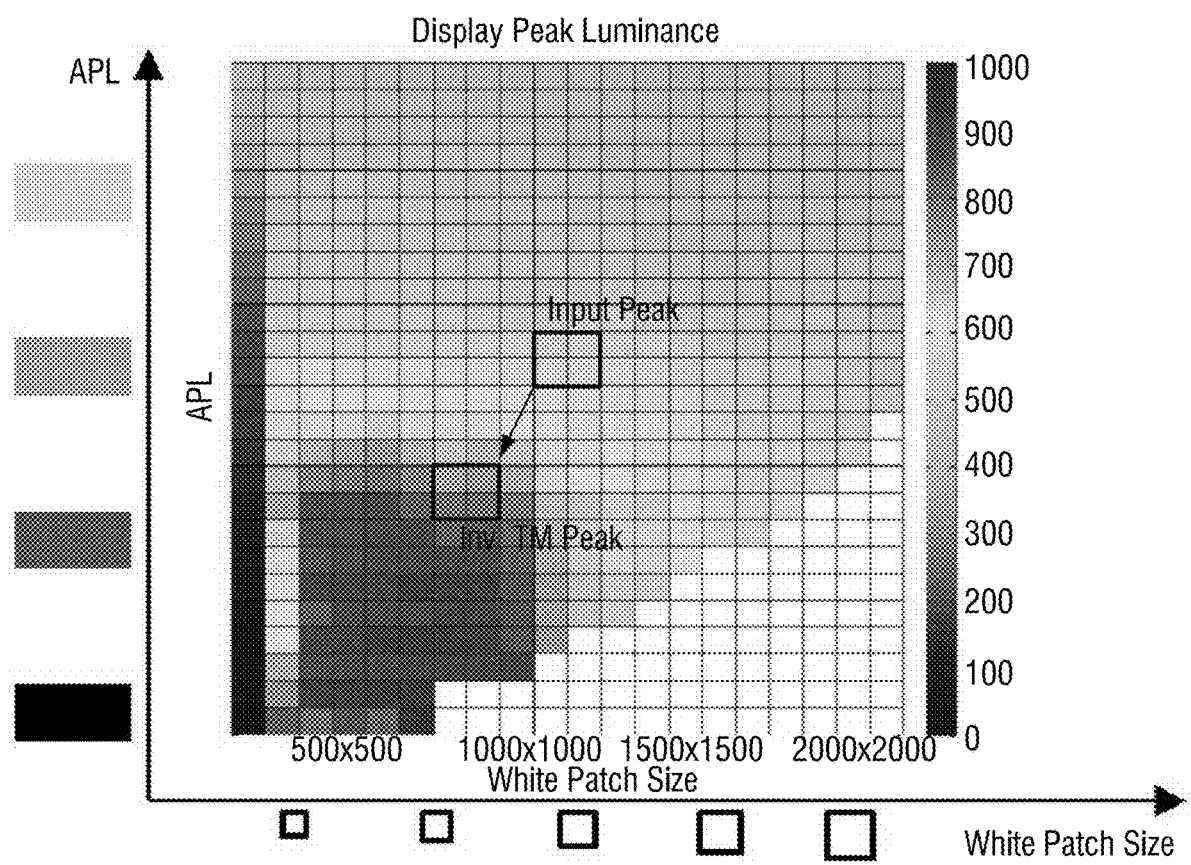
FIG. 6A is a diagram illustrating luminance variation characteristics of a display, according to an example embodiment.

FIG. 6A is a diagram illustrating luminance variation characteristics of a display, according to an example embodiment.

In general, the real peak value of the display may be obtained by varying the white patch size of the background of the image and the background gray level. In an example embodiment, the middle gradation section may be a gray level.

Referring to FIG. 6A, the display may deliver the brightness of 1,000 nits in the peak level. According to an example embodiment, the input peak of the SDR image may reduce the average pixel level (APL) and the white patch size by using the mapping function.

That is, it may varied by using the mapping function according to an example embodiment such that the background gray level and background white patch size of the display for SDR images (for example, a source device) become smaller. Based on the above, as described with reference to FIGS. 5A and 5B, the peak luminance of the HDR image converted by reducing the APL of the SDR image may be increased. Accordingly, the electronic device 100 may acquire an HDR image having a more expanded dynamic range than the image generated by converting the SDR image to the HDR image by using the related-art iTM.

Figure 6B:
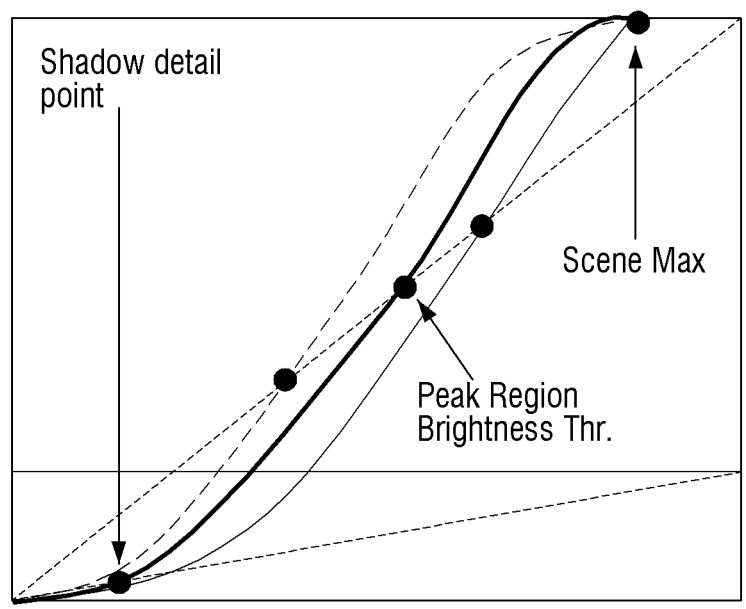
FIG. 6B is a graph illustrating a mapping function according to the luminance variation characteristics of a display at a middle point of a mapping function, according to an example embodiment.

FIG. 6B is a graph illustrating a mapping function according to the luminance variation characteristics of a display at a middle point of a mapping function, according to an example embodiment.

Referring to FIG. 6B, as described with reference to FIG. 6A, the average pixel level (APL) of the input image (for example, an SDR image) may be reduced based on the peak luminance characteristics of the display, and the luminance (nit) of the whole image may be increased. In this regard, the peak region brightness thr. of a display background gray level may be designated as a threshold of the middle point.

In addition, the middle point of the mapping function may reduce the average pixel level (APL) of the SDR image according to the luminance variation characteristics of the source device (for example, a display for SDR images) in the middle gradation section, which is a gray level. In this regard, the source device may increase the peak luminance by using the power remaining in the reduced luminance pixel area. Accordingly, the peak luminance of the display may be increased using low power and the HDR image having an expanded dynamic range may be acquired.

Figure 7:
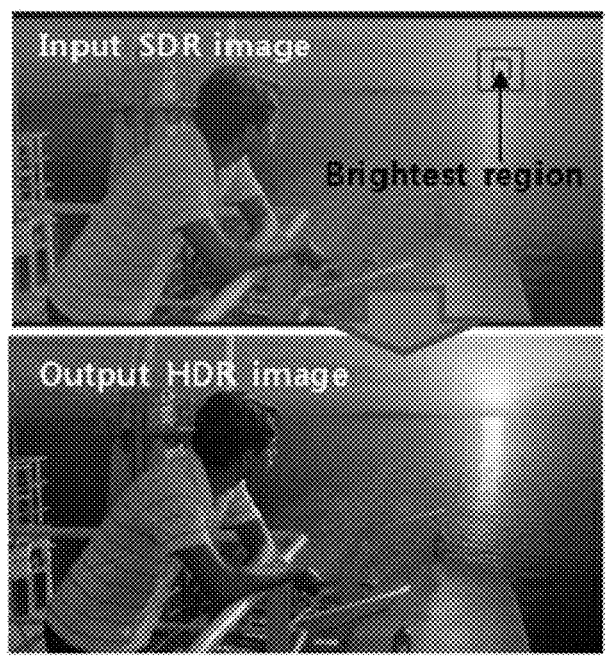
FIG. 7 are images illustrating an image conversion using a mapping function at a middle point, according to an example embodiment.

FIG. 7 are images illustrating an image conversion using a mapping function at a middle point, according to an example embodiment.

Referring to FIG. 7, the source device and the electronic device 100 may designate the threshold of peak luminance of the brightest region in the input SDR image as the middle point (peak region brightness thr.) of FIG. 6B. In addition, the electronic device 100 may maintain the low gradation black section of the SDR image as the low gradation black luminance of the output HDR image. In addition, the maximum value of the scene luminance of the SDR image may be mapped as the maximum brightness of the HDR image. Accordingly, according to an example embodiment, the electronic device 100 may be converted to the HDR image having an expanded dynamic range in the brightest region of the SDR image.

FIG. 8 are images illustrating a hue and saturation preservation using a mapping function, according to an example embodiment.

Referring to FIG. 8, the image (figure (a)) at the upper end is an HDR image which is generated by making conversion using the related-art iTM, and the image (figure (b)) of the bottom end is an HDR image which is generated by making conversion using the mapping function according to an example embodiment.

For example, the circle region 810 of the image (figure (a)) indicates that the saturation of the SDR image is changed in the converted HDR image. The circle region 820 of the image (figure (b)) indicates that the saturation of the SDR image is maintained in the HDR image converted using the mapping function according to an example embodiment.

In related art, the dynamic range expansion is implemented by applying the inverse Tone Mapping (iTM) to each of the R, G and B pixels of the input first image. As a result, in related art, there is a problem that the hue of the converted HDR image varies due to the difference in the ratio of inverse Tone Mapping in each of the R, G and B pixels of the SDR image as the first image.

However, the mapping function according to an example embodiment may convert the dynamic range of the first image by applying the gain value obtained from the mapping function to the primary colors of red (R), green (G) and blue (B) of the first image in the same manner. In this regard, the gain value (w) may be calculated by dividing the value ($f(Y_{in})$, $f(x)$ is the inverse Tone Mapping function) generated by inverse Tone Mapping the input brightness data ($Y_{in}$) of the first image by the input brightness data ($Y_{in}$). Through the above process, the electronic device 100 may solve the problem that a color in each of R, G and B pixels changes when the first image (for example, an SDR image) is converted to the second image (For example, an HDR image).

In addition, the input data of the first image may be color formats such as YCbCr, RGB, XYZ, and the like. $Y_{in}$ is generated by acquiring the luminance component Y from the input data of the first image.

The mapping function according to an example embodiment is shown below.

$$\begin{bmatrix} R_{out} \\ G_{out} \\ B_{out} \end{bmatrix} = \left( w \cdot \begin{bmatrix} R_{in} \\ G_{in} \\ B_{in} \end{bmatrix} \right) \quad \text{Mathematical formula (1)}$$

In the mathematical formula (1), w may be a gain value acquired from the mapping function, and $w=f(Y_{in})/Y_{in}$, $f(x)$ may be the inverse Tone Mapping (iTM) function. In addition, $Y_{in}$ may be the luminance value of the first image, and ($R_{in}$, $G_{in}$, $B_{in}$) may be the RGB coordinates of white level of the first image. Further, ($R_{out}$, $G_{out}$, $B_{out}$) may be the RGB coordinates of white level of the display for the converted HDR image.

For example, the first image may be an SDR image, and the luminance value of the first image may be a code value in which the pixel luminance value of the SDR image is normalized to 0-1.

In addition, in related art, when the dynamic range conversion is performed using the iTM, there is a problem that the saturation of the first image (for example, an SDR image) is not maintained in the second image (for example, an HDR image).

According to an example embodiment, the electronic device 100 may acquire the second image (For example, an HDR image) which maintains the hue and saturation of the first image (for example, an SDR image) by applying the saturation compensation logic to the mapping function which is generated by inverse Tone Mapping based on the same gain (w) of the mathematical formula (1) described above.

$$\begin{bmatrix} R_{out} \\ G_{out} \\ B_{out} \end{bmatrix} = \alpha \cdot \left( w \cdot \begin{bmatrix} R_{in} \\ G_{in} \\ B_{in} \end{bmatrix} \right) + (1-\alpha) \cdot f\left( \begin{bmatrix} R_{in} \\ G_{in} \\ B_{in} \end{bmatrix} \right) \quad \text{Mathematical formula (2)}$$

In the mathematical formula (2), a may be a constant, and w may be a gain value acquired from the mapping function. In addition, $w=f(Yin)/Yin$, $f(x)$ may be the inverse Tone Mapping (iTM) function, and Yin may be the luminance value of the first image. Further, (Rin, Gin, Bin) may be the RGB coordinates of white level of the first image, and (Rout, Gout, Bout) may be the RGB coordinates of white level of the display.

In another example embodiment, the mapping function for maintaining the hue and saturation of the first image is shown below.

$$\begin{bmatrix} R_{out} \\ G_{out} \\ B_{out} \end{bmatrix} = \quad \text{Mathematical formula (3)}$$

-continued $$I_w + \alpha \cdot \begin{bmatrix} R_{in} - I_{in} \\ G_{in} - I_{in} \\ B_{in} - I_{in} \end{bmatrix} + (1-\alpha) \cdot \begin{bmatrix} R_w - I_w \\ G_w - I_w \\ B_w - I_w \end{bmatrix}$$

In the mathematical formula (3), $I_{in}$ may be the average RGB coordinates of white level of the first image, which is $I_{in}=(R_{in}+G_{in}+B_{in})/3$, and $I_w$ may be the average RGB coordinates of white level on the peak point of the first image, which is $I_w=(R_{out}+G_{out}+B_{out})/3$. In addition, ($R_w$, $G_w$, $B_w$) may be the RGB white coordinates to which the mapping function (mathematical formula 1) according to an example embodiment is applied, and a may be a constant. Further, ($R_{in}$, $G_{in}$, $B_{in}$) may be the RGB coordinates of white level of the first image, and ($R_{out}$, $G_{out}$, $B_{out}$) may be the RGB coordinates of white level of the display (for example, a display for HDR) displaying the converted image.

Figure 9A:
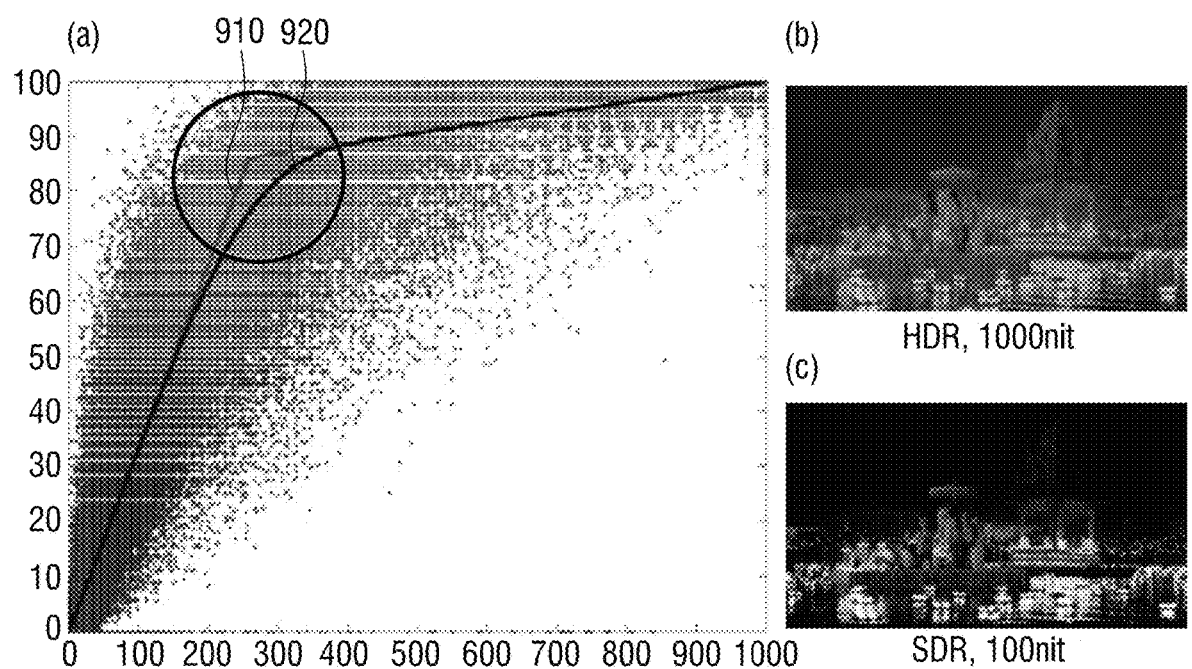
FIGS. 9A and 9B are graphs and images illustrating an image conversion in which a smoothing filter is applied to the mapping function, according to an example embodiment.
Figure 9B:
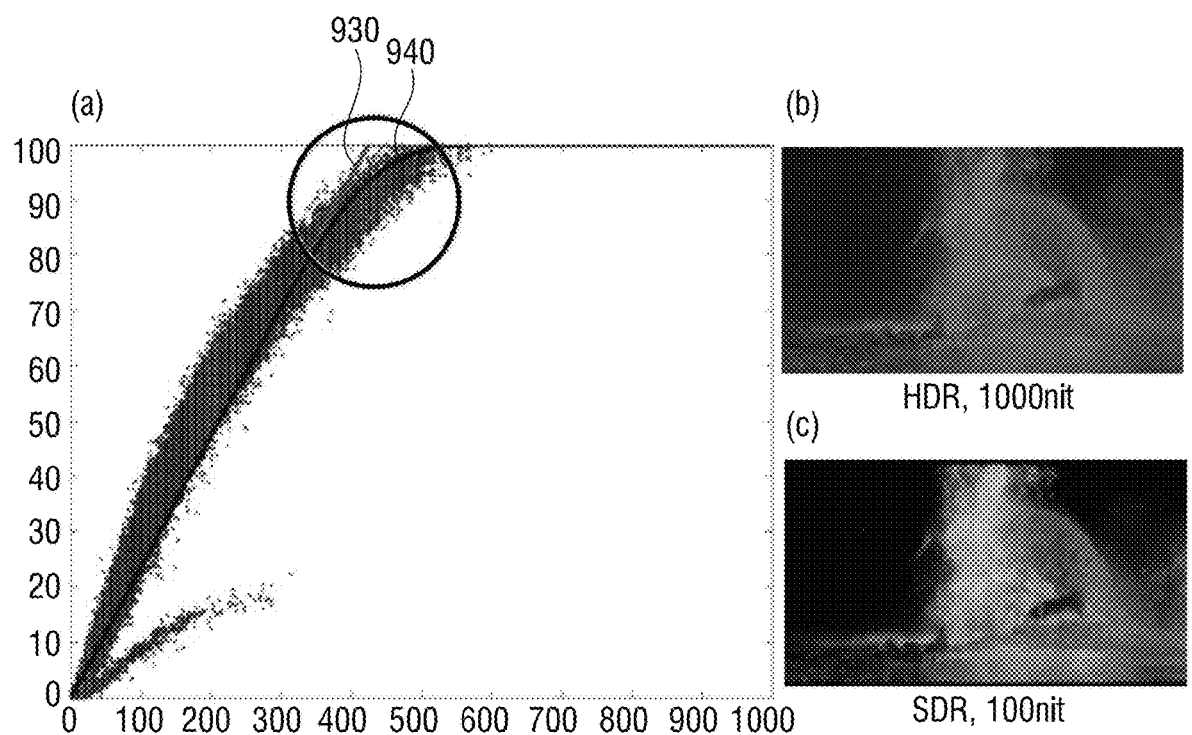

FIGS. 9A and 9B are graphs and images illustrating an image conversion in which a smoothing filter is applied to the mapping function, according to an example embodiment. According to an example embodiment, the electronic device 100 may apply a smoothing filter to a mapping function. The electronic device 100 may remove a step difference (e.g., color distortion, color contour, etc.) occurring when the dynamic range of the first image is converted to the second image, and acquire a smoother second image.

Referring to FIGS. 9A and 9B, it can be identified that a color contour due to the step difference occurs in the graph before 910, 930 the smoothing filter is applied to the electronic device 100. Conversely, it can be identified that the step difference is removed from the graph after 920, 940 the smoothing filter is applied to the electronic device 100. In addition, the electronic device 100 may acquire a smoother HDR image (figure (b) of FIG. 9A and figure (b) of FIG. 9B) from which the step difference is removed using the smoothing filter. Accordingly, when the first image (e.g., an SDR image) is converted to the second image (e.g., an HDR image), the electronic device 100 may remove the distortion (e.g., step difference) occurring during the inverse Tone Mapping (iTM) by applying the smoothing filter to the mapping function.

For example, the source device and the electronic device 100 may derive a smoothing parameter by using a Gaussian smoothing. The Gaussian smoothing is a technique well known to those skilled in the art and thus, the detailed description thereof will not be provided herein.

According to an example embodiment, the source device and the electronic device 100 may select a smoothing parameter by using the break point and Gaussian smoothing described above with reference to FIG. 2B.

For example, the smoothing parameter may be identified according to a distance from an arbitrary point, p, on a linear straight line (e.g., inclination of the straight line d=max nit (y-axis)/max code value (x-axis)) of the graph (b) of FIG. 2B to each of the break points iTM×1, iTM×2, and iTM×3. In another example, the smoothing parameter may be identified according to a difference between inclinations of front and back straight lines of each break point iTM×1, iTM×2, and iTM×3.

The source device may generate a curve parameter capable of generating a mapping function, a plurality of points, a smoothing parameter, etc. as metadata and supply the same to the electronic device 100. When the metadata is supplied from the source device, the electronic device 100 may recover the mapping function and acquire a curve parameter, a plurality of points, a smoothing parameter, and the like, included in the mapping function from the metadata. The electronic device 100 may adjust the acquired parameter and plurality of points and generate a suitable mapping function for the user.

The Gaussian smoothing is only an example, and various smoothing filtering techniques for removing the color difference of the image may be used.

FIG. 10 is a sequence diagram illustrating a method for image conversion, according to an example embodiment.

Referring to FIG. 10, at operation S1010, the electronic device 100 may receive a first image from the source device. The first image may include encoding data having luminance information of the first image and mapping function information including a plurality of points capable of generating a mapping function, a parameter, and the like. The electronic device 100 may receive, from the source device, a plurality of points and parameters as metadata.

For example, the source device may be a display device for SDR images. In addition, the source device may be a device for mastering.

At operation S1020, the electronic device 100 may decode luminance information of the first image received from the source device.

At operation S1030, the electronic device 100 may convert a dynamic range of the first image by using the mapping function information received from the source device based on the luminance value of the decoded first image. In this regard, the mapping function may be generated based on the display luminance variation characteristic of the source device providing the first image and the scene luminance characteristic of the first image. According to an example embodiment, the converted second image may maintain the hue and saturation of the first image and reduce the color contour. The mapping function and the dynamic range conversion method of the first image is described above in the present disclosure and thus, the detailed description thereof will not be provided herein.

At operation S1040, the electronic device 100 may display a second image generated by converting a dynamic range of the first image by using the mapping function. For example, the first image may be an SDR image, and the converted second image may be an HDR image.

Figure 11:
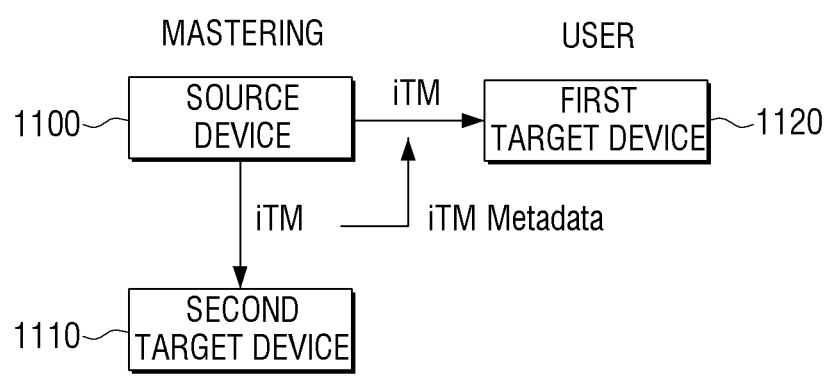
FIG. 11 is a diagram illustrating a system for performing an image conversion, according to an example embodiment.

FIG. 11 is a diagram illustrating a system for performing an image conversion, according to an example embodiment.

Referring to FIG. 11, a system 10 for performing an image conversion according to an example embodiment may include a source device 1100, a first target device 1120, and a second target device 1110.

The source device 1100 may be a device that displays or generates a first image. For example, the first image may be a standard dynamic range (SDR) image. The source device 1100 may be an image content provider. In addition, the source device 1100 may be an image processing apparatus connected to an electronic device capable of displaying an SDR image.

The source device 1100 may generate a mapping function according to an example embodiment by using an inverse Tone Mapping (iTM) in the display mastering process. The mapping function according to an example embodiment may be a piece-wise linear function having a plurality of N points according to a luminance value of the first image.

The plurality of N points may be identified according to the scene luminance characteristic of the first image and the display luminance variation characteristics of the source device 1100 and the target devices 1110 and 1120. The plurality of N points are described above and thus, the description thereof will be omitted herein.

The mapping function according to an example embodiment may apply a smoothing filter to remove the step difference occurring during the image conversion.

The source device 1100 may generate a curve parameter capable of generating a mapping function, a plurality of N points, a smoothing parameter, and the like, as metadata, and may transmit the generated metadata to the first target device 1120.

The source device 1100 may transmit a video stream to the first target device 1120. For example, the video stream may be H.26L(ITU-T Q6/16 VCEG), such as H.264, H.265, and the like.

The first target device 1120 may be a display device, such as a LCD, an OLED TV, a mobile device, a camera, and the like. The first target device 1120 may receive the metadata of the mapping function from the source device. The target device 1120 may recover the received metadata and acquire a plurality of points and a parameter. The target device 1120 may adjust the plurality of acquired points and the acquired parameter. The first target device 1120 may use a mapping function applied at the time of manufacturing, or recover the mapping function of the source device, so that a suitable mapping function for the user is generated using a plurality of points and parameter acquired from the metadata and adjusted. The electronic device 100 may generate a suitable mapping function for the user and convert the first image (e.g., an SDR image) received from the source device to a second image (e.g., an HDR image).

The second target device may convert the first image (e.g., an SDR image) received from the source device to a second image (e.g., an HDR image) by using a mapping function generated in the source device 1100. The second target device 1110 may be a display device which converts an image in the mastering stage and displaying the converted image.

Accordingly, according to an example embodiment, the electronic device 100 may reduce the occurrence of the color step difference and color contour generated when a dynamic range of the first image (e.g., an SDR image) is converted to the second image (e.g., an HDR image). In addition, the electronic device 100 may expand the dynamic range in a scene unit of the first image through the inverse Tone Mapping (iTM) based on the scene luminance of the first image, thus improving the dynamic representation effect of the converted second image. In addition, the electronic device 100 may apply the saturation compensation to the mapping function and acquire a second image which maintains the hue and saturation of the first image. In addition, the electronic device 100 may acquire a smoother second image by applying a smoothing filter to the mapping function.

An apparatus (e.g., the electronic device 100) or a method (e.g., operations) according to various exemplary embodiments may be executed, for example, by at least one computer (e.g., processor) that executes an instruction included in at least one program of programs maintained on computer-readable storage media.

When an instruction is executed by a computer (e.g., processor), at least one computer may perform a function corresponding to the instruction. The computer readable recording medium may be, for example, a memory.

A program may be included in computer-readable storage media, such as hard disk, floppy disk, magnetic media (e.g., a magnetic tape), optical media (e.g., compact disc read only memory (CD-ROM), digital versatile disc (DVD), magnetooptical media (e.g., floptical disk), hardware device (e.g., a read only memory (ROM), a random access memory (RAM), a flash memory, or the like), or the like. In this case, a storage medium is generally included as a part of elements of the electronic device 100 but may be installed through a port of the electronic device 100 or may be included in an external device (e.g., cloud, a server, or another electronic device) positioned outside the electronic device 100. Also, the program may be divided and stored on a plurality of storage media. Here, at least some of the plurality of storage media may be positioned in an external device of the electronic device 100.

An instruction may include a machine language code that is made by a compiler and a high-level language code that may be executed by a computer by using an interpreter or the like. The hardware device described above may be constituted to operate as one or more software modules in order to perform operations of various exemplary embodiments, but an opposite case is similar.

The foregoing exemplary embodiments and advantages are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic device, comprising:
a display; and
a processor configured to:
based on an image being received from a source device, convert a low dynamic range of the image to a high dynamic range by using a mapping function, and
control the display to display the image based on the high dynamic range, wherein
the low dynamic range corresponds to a luminance of the source device and the high dynamic range corresponds to a luminance of the display,
the mapping function comprises a plurality of points for mapping luminance values included in the low dynamic range to luminance values included in the high dynamic range based on a scene of the image,
a peak point of the plurality of points maps a maximum luminance value included in the scene and which is lower than a maximum luminance value of the low dynamic range, to a maximum luminance value of the high dynamic range,
a whole luminance of the image displayed on the display is greater than a whole luminance of the image as displayed on the source device, and
an average luminance of the image displayed on the display is smaller than an average luminance of the image as displayed on the source device.

2. The electronic device as claimed in claim 1, wherein the mapping function is a piecewise linear function including the plurality of points, and
wherein a smoothing filter is applied to the piecewise linear function.

3. The electronic device as claimed in claim 1, wherein the plurality of points include a shadow point, which is a black level, wherein, in the mapping function, the shadow point is converted from a black level of the image to a black level of the display of the electronic device, and
wherein the mapping function maintains a low gradation black of the image according to a ratio of a luminance of the image to a luminance of the display of the electronic device.

4. The electronic device as claimed in claim 1, wherein the peak point is a white level, and
wherein, in the mapping function, the peak point is converted from a white level of the image to a white level of the display of the electronic device.

5. The electronic device as claimed in claim 1, wherein the plurality of points include a middle point, which is an intermediate tone level,
wherein, in the mapping function, the middle point is converted from an intermediate tone level of the image to an intermediate tone level of the display of the electronic device, and
wherein the mapping function adjusts an average pixel level based on a characteristic of a change in luminance of the source device and a characteristic of a change in luminance of the scene of the image.

6. The electronic device as claimed in claim 1, wherein the processor is configured to:
receive, from the source device, metadata including the plurality of points and a parameter for generating the mapping function,
acquire the plurality of points and the parameter from the received metadata, and
generate the mapping function by adjusting the acquired plurality of points and the acquired parameter.

7. The electronic device as claimed in claim 1, wherein, to convert the low dynamic range, the processor is configured to convert the low dynamic range of the image by applying a gain value obtained from the mapping function to primary colors of red (R), green (G), and blue (B) of the image in the same manner.

8. The electronic device as claimed in claim 7, wherein the mapping function is $$\begin{bmatrix} R_{out} \\ G_{out} \\ B_{out} \end{bmatrix} = \left( w \cdot \begin{bmatrix} R_{in} \\ G_{in} \\ B_{in} \end{bmatrix} \right),$$

where w is f(Yin)/Yin, which is a gain value obtained from the mapping function, and f(x) is an inverse Tone Mapping function (iTM), and Yin is a luminance value of the image, and (Rin, Gin, Bin) is RGB coordinates of a white level of an image, and (Rout, Gout, Bout) are RGB coordinates of a white level of the display of the electronic device.

9. The electronic device as claimed in claim 8, wherein a function to preserve hue and saturation of the image based on the mapping function is $$\begin{bmatrix} R_{out} \\ G_{out} \\ B_{out} \end{bmatrix} = \alpha \cdot \left( w \cdot \begin{bmatrix} R_{in} \\ G_{in} \\ B_{in} \end{bmatrix} \right) + (1-\alpha) \cdot f\left( \begin{bmatrix} R_{in} \\ G_{in} \\ B_{in} \end{bmatrix} \right),$$

where w is f(Yin)/Yin, which is a gain value obtained from the mapping function, and f(x) is an inverse Tone Mapping (iTM) function, and Yin is a luminance value data of the image, and a is a constant, and (Rin, Gin, Bin) are RGB coordinates of a white level of an image, and (Rout, Gout, Bout) are RGB coordinates of a white level of the display of the electronic device.

10. An image conversion method, comprising:
by an electronic device:
receiving an image from a source device;
converting a low dynamic range of the image to a high dynamic range by using a mapping function; and
displaying the image on a display of the electronic device based on the high dynamic range, wherein
   the low dynamic range corresponds to a luminance of the source device and the high dynamic range corresponds to a luminance of the display of the electronic device,
   the mapping function comprises a plurality of points for mapping luminance values included in the low dynamic range to luminance values included in the high dynamic range based on a scene of the image,
   a peak point of the plurality of points maps a maximum luminance value included in the scene and which is lower than a maximum luminance value of the low dynamic range, to a maximum luminance value of the high dynamic range,
   a whole luminance of the image displayed on the display is greater than a whole luminance of the image as displayed on the source device, and
   an average luminance of the image displayed on the display is smaller than an average luminance of the image as displayed on the source device.

11. The image conversion method as claimed in claim 10, wherein the mapping function is a piecewise linear function including the plurality of points, and
wherein a smoothing filter is applied to the piecewise linear function.

12. The image conversion method as claimed in claim 10,
wherein the plurality of points include a shadow point, which is a black level of an image pixel,
wherein, in the mapping function, the shadow point is converted from a black level of the image to a black level of the display of the electronic device, and the mapping function maintains a low gradation black of the image according to a ratio of a luminance of the image to a luminance of the display of the electronic device.

13. The image conversion method as claimed in claim 10,
wherein the peak point is a white level, and
wherein, in the mapping function, the peak point is converted from a white level of the image to a white level of the display of the electronic device.

14. The image conversion method as claimed in claim 10,
wherein the plurality of points include a middle point, which is an intermediate tone level,
wherein, in the mapping function, the middle point is converted from an intermediate tone level of the image to an intermediate tone level of the display of the electronic device, and the mapping function adjusts an average pixel level on the basis of a characteristic of a change in luminance of the source device and a characteristic of a change in luminance of the scene of the image.

15. The image conversion method as claimed in claim 10, further comprising:
by the electronic device:
receiving, from the source device, metadata including the plurality of points and a parameter for generating the mapping function,
acquiring the plurality of points and the parameter from the received metadata, and
generating the mapping function by adjusting the acquired plurality of points and the acquired parameter.

* * * * *

UNITED STATES PATENT AND TRADEMARK OFFICE
CERTIFICATE OF CORRECTION

| | |
|---|---|
| PATENT NO. | : 10,885,614 B2 |
| APPLICATION NO. | : 15/751340 |
| DATED | : January 5, 2021 |
| INVENTOR(S) | : Seung-ho Park et al. |

Page 1 of 1

It is certified that error appears in the above-identified patent and that said Letters Patent is hereby corrected as shown below:

In the Claims

Column 21, Line 1:
In Claim 9, delete "and a" and insert -- and α --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*